(12) United States Patent
Scudder et al.

(10) Patent No.: US 7,860,115 B1
(45) Date of Patent: Dec. 28, 2010

(54) WITHDRAWING MULTIPLE ADVERTISED ROUTES BASED ON A SINGLE TAG WHICH MAY BE OF PARTICULAR USE IN BORDER GATEWAY PROTOCOL

(75) Inventors: John Galen Scudder, Ann Arbor, MI (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1373 days.

(21) Appl. No.: 10/739,238

(22) Filed: Dec. 18, 2003

(51) Int. Cl.
*H04L 12/28* (2006.01)
*G06F 15/173* (2006.01)

(52) U.S. Cl. .................. 370/401; 370/229; 370/235; 370/352; 370/389; 370/392; 709/238; 709/239; 709/242; 709/243; 709/244

(58) Field of Classification Search ............ 370/395.52, 370/229–485, 235–395.21; 709/238–244
See application file for complete search history.

(56) References Cited

U.S. PATENT DOCUMENTS

| | | | | |
|---|---|---|---|---|
| 6,055,561 A * | 4/2000 | Feldman et al. | ............ | 709/200 |
| 6,339,595 B1 * | 1/2002 | Rekhter et al. | ............ | 370/392 |
| 6,463,061 B1 * | 10/2002 | Rekhter et al. | ............ | 370/392 |
| 6,526,056 B1 * | 2/2003 | Rekhter et al. | ............ | 370/392 |
| 6,636,895 B1 * | 10/2003 | Li et al. | ............ | 709/238 |
| 6,721,269 B2 * | 4/2004 | Cao et al. | ............ | 370/227 |
| 6,741,585 B1 * | 5/2004 | Munoz et al. | ............ | 370/352 |
| 6,895,008 B2 * | 5/2005 | Enoki et al. | ............ | 370/392 |
| 7,002,973 B2 * | 2/2006 | MeLampy et al. | ............ | 370/401 |
| 7,007,101 B1 * | 2/2006 | Schwaderer | ............ | 709/238 |
| 7,023,808 B2 * | 4/2006 | Ball et al. | ............ | 370/238 |
| 7,028,092 B2 * | 4/2006 | MeLampy et al. | ............ | 709/230 |
| 7,031,311 B2 * | 4/2006 | MeLampy et al. | ............ | 370/392 |
| 7,035,226 B2 * | 4/2006 | Enoki et al. | ............ | 370/254 |
| 7,072,303 B2 * | 7/2006 | MeLampy et al. | ............ | 370/238 |
| 7,106,736 B2 * | 9/2006 | Kalkunte | ............ | 370/391 |

(Continued)

OTHER PUBLICATIONS

A Border Gateway Protocol 4 (BGP-4), RFC 1771, IETF, Mar. 1995.

(Continued)

*Primary Examiner*—Ayaz R Sheikh
*Assistant Examiner*—Venkatesh Haliyur
(74) *Attorney, Agent, or Firm*—The Law Office of Kirk D. Williams

(57) ABSTRACT

Disclosed are, inter alia, methods, apparatus, data structures, computer-readable medium, mechanisms, and means for withdrawing routes based on a tag. One implementation receives one or more messages identifying multiple routes and a tag associated with the multiple routes. A routing database is updated to include the routes. A particular message associated with a route withdraw operation is received, with the particular message including an indication of the tag. The multiple routes are removed from the routing database in response to receiving the tag. For example, the tag may be a Border Gateway Protocol attribute, a Border Gateway Protocol communities attribute, or some other indication. When some devices do not support this feature, before other nodes will typically send to a particular device a message to withdraw multiple routes based on a tag, the particular device must first advertise that it has this capability and/or it will withdraw multiple routes based on a tag.

20 Claims, 4 Drawing Sheets

U.S. PATENT DOCUMENTS

| | | | |
|---|---|---|---|
| 7,133,365 B2* | 11/2006 | Klinker et al. | 370/238 |
| 7,154,889 B1* | 12/2006 | Rekhter et al. | 370/392 |
| 7,155,535 B2* | 12/2006 | Agarwal et al. | 709/238 |
| 7,269,157 B2* | 9/2007 | Klinker et al. | 370/351 |
| 7,307,990 B2* | 12/2007 | Rosen et al. | 370/392 |
| 7,339,937 B2* | 3/2008 | Mitra et al. | 370/395.53 |
| 7,369,556 B1* | 5/2008 | Rekhter et al. | 370/392 |
| 7,707,308 B1* | 4/2010 | Hogge et al. | 709/239 |
| 2002/0029287 A1* | 3/2002 | Yemini et al. | 709/238 |
| 2002/0141343 A1* | 10/2002 | Bays | 370/235 |
| 2002/0163884 A1* | 11/2002 | Peles et al. | 370/229 |
| 2002/0199016 A1* | 12/2002 | Freedman | 709/241 |
| 2003/0099237 A1* | 5/2003 | Mitra et al. | 370/393 |
| 2003/0204619 A1* | 10/2003 | Bays | 709/238 |
| 2005/0025118 A1* | 2/2005 | Hao et al. | 370/351 |
| 2005/0074003 A1* | 4/2005 | Ball et al. | 370/389 |

OTHER PUBLICATIONS

A Border Gateway Protocol 4 (BGP-4), draft-ietf-idr-bgp4-22, IETF working draft, Oct. 2003.

BGP Communities Attribute, RFC 1997, IETF, Aug. 1996.

Capabilities Advertisement With BGP-4, RCF 3392, IETF, Nov. 2002.

BGP Extended Communities Attribute, draft-ietf-idr-bgp-ext-communities-06, IETF working draft, Aug. 2003.

* cited by examiner

WITHDRAWING MULTIPLE ADVERTISED ROUTES BASED ON A SINGLE TAG WHICH MAY BE OF PARTICULAR USE IN BORDER GATEWAY PROTOCOL

TECHNICAL FIELD

One embodiment of the invention relates to communications and computer systems, especially networked routers, packet switching systems, and other devices; and more particularly, one embodiment relates to withdrawing multiple advertised routes based on a single tag which may be of particular use in Border Gateway Protocol.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and shares routing information among other nodes of a network. Border Gateway Protocol (BGP) is a common protocol used to exchange routing information between subnetworks within the network. BGP is an inter-Autonomous System routing protocol. One version of it is described in A BORDER GATEWAY PROTOCOL 4 (BGP-4), RFC 1771, IETF, March 1995, which is hereby incorporated by reference. Another version is described in A BORDER GATEWAY PROTOCOL 4 (BGP-4), draft-ietf-idr-bgp4-22, IETF working draft, October 2003, which is hereby incorporated by reference. Some other documents which describe aspects of Border Gateway Protocol include: BGP COMMUNITIES ATTRIBUTE, RFC 1997, IETF, August 1996; CAPABILITIES ADVERTISEMENT WITH BGP-4, RFC 3392, IETF, November 2002; and *BGP Extended Communities Attribute*, draft-ietf-idr-bgp-ext-communities-06, IETF working draft, August 2003; with all of these documents being hereby incorporated by reference.

A primary function of a BGP speaking system is to exchange network reachability information with other BGP systems. This network reachability information includes information on the list of Autonomous Systems (ASs) that reachability information traverses. This information is sufficient to construct a graph of AS connectivity from which routing loops may be pruned and some policy decisions at the AS level may be enforced. To characterize the set of policy decisions that can be enforced using BGP, one must focus on the rule that a BGP speaker advertise to its peers (other BGP speakers which it communicates with) in neighboring ASs only those routes that it itself uses. Note, an Autonomous System typically refers to a set of routers under a single technical administration, using an interior gateway protocol and common metrics to route packets within the AS, and using an exterior gateway protocol to route packets to other ASs. It has also become common for a single AS to use several interior gateway protocols and sometimes several sets of metrics within an AS.

Communicating nodes initially exchange their entire BGP routing table, and then send incremental updates as the routing tables change. BGP does not require periodic refresh of the entire BGP routing table. Therefore, a BGP speaker must retain the current version of the entire BGP routing tables of all of its peers for the duration of the connection. KeepAlive messages are sent periodically to ensure the liveness of the connection. Notification messages are sent in response to errors or special conditions. If a connection encounters an error condition, a notification message is sent, the connection is closed and the routes associated with the connection are withdrawn from the routing tables.

A route may be viewed as a unit of information that pairs a destination with the attributes of a path to that destination. For example, a route may be considered to be one or more Network Layer Reachability Information (NLRI), which are associated with one set of path attributes.

Routes are advertised between a pair of BGP speakers in Update messages, with the destination being the systems whose IP addresses are reported in the Network Layer Reachability Information (NLRI) field of the Update message, and the path is the information reported in the path attributes fields of the same Update message. Routes are stored in the Routing Information Bases (RIBs): namely, the Adj-RIBs-In, the Loc-RIB, and the Adj-RIBS-Out. Routes that will be advertised to other BGP speakers must be present in the Adj-RIB-Out; routes that will be used by the local BGP speaker must be present in the Loc-RIB, and the next hop for each of these routes must be present in the local BGP speaker's forwarding information base; and routes that are received from other BGP speakers are present in the Adj-RIBs-In.

If a BGP speaker chooses to advertise a route, it may add to or modify the path attributes of the route before advertising it to a peer. BGP provides mechanisms by which a BGP speaker can inform its peer that a previously advertised route is no longer available for use. There are three methods specified in RFC 1771 by which a given BGP speaker can indicate that a route has been withdrawn from service: the IP prefix that expresses destinations for a previously advertised route can be advertised in the withdrawn routes field in the Update message, thus marking the associated route as being no longer available for use; a replacement route with the same Network Layer Reachability Information can be advertised; and the BGP speaker to BGP speaker connection can be closed, which implicitly removes from service all routes which the pair of speakers had advertised to each other.

An Update message is used to advertise a single feasible route to a peer, or to withdraw multiple unfeasible routes from service. An Update message may simultaneously advertise a feasible route and withdraw multiple unfeasible routes from service. The Update message always includes the fixed-size BGP header, and can optionally include other fields including: Unfeasible Routes Length, Withdrawn Routes, Total Path Attribute Length, Path Attributes, and Network Layer Reachability Information.

The Unfeasible Routes Length field indicates the total length of the Withdrawn Routes field in octets.

The Withdrawn Routes field is a variable length field that contains a list of IP address prefixes for the routes that are being withdrawn from service. Each IP address prefix is encoded as a two-tuple of the form <length, prefix>, with the Length field indicating the length in bits of the IP address prefix, with a length of zero indicating a prefix that matches all IP addresses (with prefix, itself, of zero octets); and the Prefix field containing IP address prefixes followed by enough trailing bits to make the end of the field fall on an octet boundary. Note that the value of trailing bits is irrelevant.

The Total Path Attribute Length includes an unsigned integer indicating the total length of the Path Attributes field in octets. Its value must allow the length of the Network Layer Reachability field to be determined as specified below. A value of 0 indicates that no Network Layer Reachability Information field is present in this Update message.

The Path Attributes is a variable length sequence of path attributes and is present in every Update. Each path attribute is a triple <attribute type, attribute length, attribute value> of variable length.

The Network Layer Reachability Information field is a variable length field containing a list of IP address prefixes.

An Update message can advertise at most one route, which may be described by several path attributes. All path attributes contained in a given Update messages apply to the destinations carried in the Network Layer Reachability Information field of the Update message.

An Update message can list multiple routes to be withdrawn from service. Each such route is identified by its destination (expressed as an IP prefix), which unambiguously identifies the route in the context of the BGP speaker—BGP speaker connection to which it has been previously been advertised. An Update message may advertise only routes to be withdrawn from service, in which case it will not include path attributes or Network Layer Reachability Information. Conversely, it may advertise only a feasible route, in which case the Withdrawn Routes field need not be present.

If the Update message contains a non-empty Withdrawn Routes field, the previously advertised routes whose destinations (expressed as IP prefixes) are contained in this field shall be removed from the Adj-RIB-In. This BGP speaker shall run its Decision Process since the previously advertised route is no longer available for use.

SUMMARY

Disclosed are, inter alia, methods, apparatus, data structures, computer-readable medium, mechanisms, and means for withdrawing routes based on a tag. One embodiment receives one or more messages identifying multiple routes and a tag associated with the multiple routes. A routing database is updated to include the routes. A particular message associated with a route withdraw operation is received, with the particular message including an indication of the tag. The multiple routes are removed from the routing database in response to receiving the tag. In one embodiment, the tag is a Border Gateway Protocol attribute. In one embodiment, the tag is a Border Gateway Protocol communities attribute. In one embodiment, before other nodes will send to a particular device a message to withdraw multiple routes based on a tag, the particular device must first advertise that it has this capability and/or it will withdraw multiple routes based on a tag. In one embodiment, a route may be associated with a single tag. In one embodiment, a route may be associated with multiple tags.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
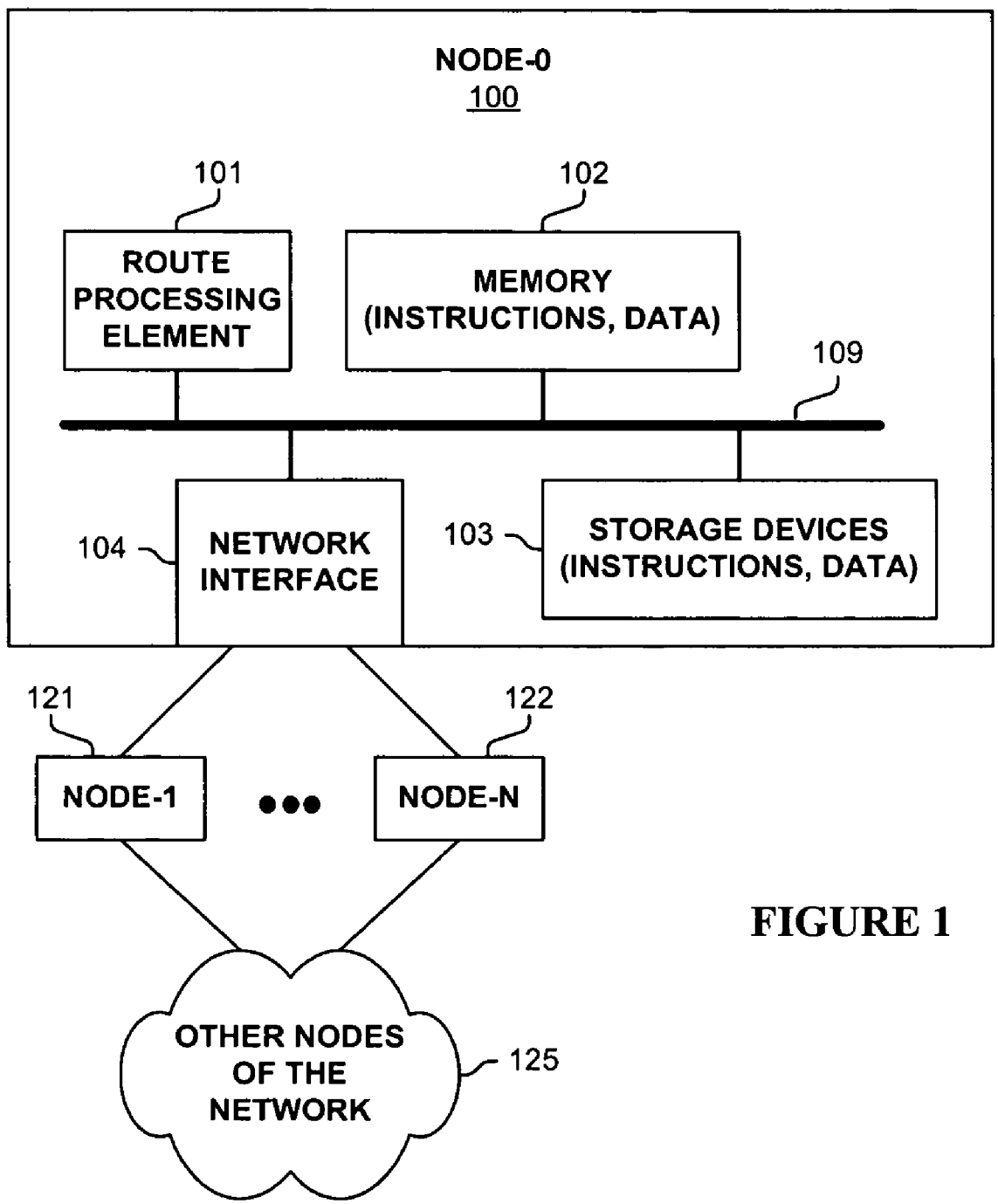
FIG. 1 is a block diagram of an exemplary system employing one embodiment.

Disclosed are, inter alia, methods, apparatus, data structures, computer-readable medium, mechanisms, and means for withdrawing multiple advertised routes based on a single tag which may be of particular use in Border Gateway Protocol.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for withdrawing routes based on a tag. One embodiment receives one or more messages identifying multiple routes and a tag associated with the multiple routes. A routing database is updated to include the routes. A particular message associated with a route withdraw operation is received, with the particular message including an indication of the tag. The multiple routes are removed from the routing database in response to receiving the tag. In one embodiment, the tag is a Border Gateway Protocol attribute. In one embodiment, the tag is a Border Gateway Protocol communities attribute. In one embodiment, before other nodes will send to a particular device a message to withdraw multiple routes based on a tag, the particular device must first advertise that it has this capability and/or it will withdraw multiple routes based on a tag. In one embodiment, a route may be associated with a single tag. In one embodiment, a route may be associated with multiple tags.

One embodiment operates in the context of Border Gateway Protocol (BGP), and this one embodiment is now described, with these teachings applicable to other embodiments and other protocols. When a BGP speaker wishes to withdraw all of the routes which were advertised with a particular tag (e.g., a path attribute, community attribute, or other tag value), it may use a single tag to withdraw multiple routes previously associated with the tag in lieu of the conventional withdraw mechanism.

When a BGP speaker advertises a route, it may optionally advertise it with one or more tags with which it is associated. This route may or may not have been previously associated with the tag or even subsequently associated with the tag. If the tag is in the form of a path attribute, the BGP can maintain the attribute as it does other attributes. In one embodiment, these tags are stored in a data structure in a manner to efficiently identify the routes matching a tag. In one embodiment, an associative or other memory device is used in storing the associations between tags and routes.

In one embodiment, a device advertises that it supports withdrawal of routes by tags (WRBT). For example, the WRBT capability may be advertised in a BGP open message, another message indicating such capability, or in any other manner. The BGP speaker then processes these communities received from any peer which similarly has this capability (and usually has advertised this capability to other nodes, although this is not required).

Figure 3A:
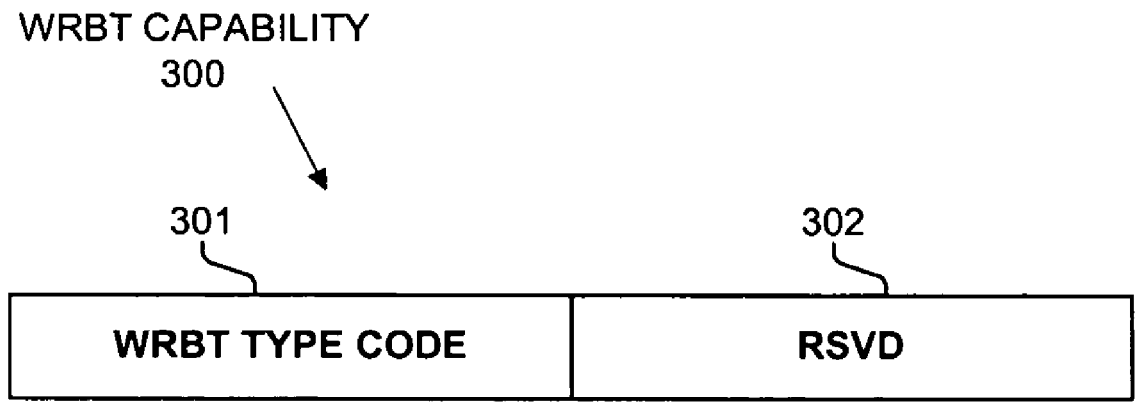
FIG. 3A is a block diagram illustrating fields used in one embodiment to advertise a withdrawal of routes by tags (WRBT) capability.

An example of such a WRBT capability advertisement 300 used in one embodiment is shown in FIG. 3A, with WRBT capability advertisement 300 including a WRBT type code 301 (e.g., a byte with its value indicating the WRBT capability), and an optional second byte with its value reserved, and is typically set to zero and ignored (i.e., to conform with size requirement in a specification of BGP). Of course, numerous other messages and/or mechanisms can be used to advertise this capability, as well as it being entered via a command line or other interface.

Figure 3B:
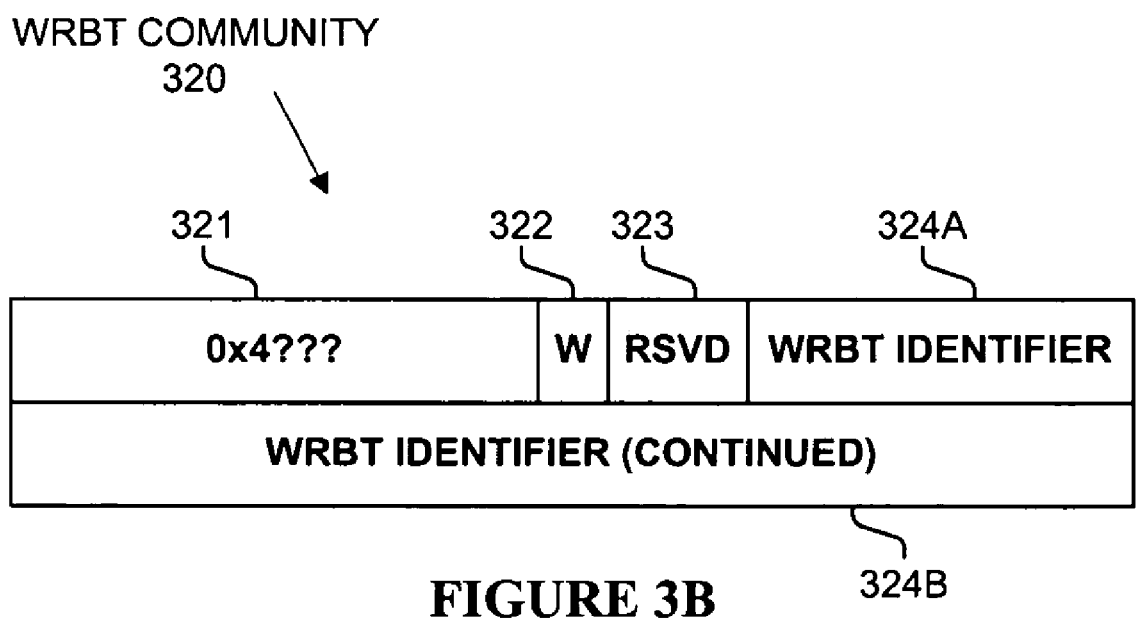
FIG. 3B is a block diagram illustrating fields used in one embodiment to associate a WRBT identifier with one or more routes, or to withdraw a specified WRBT identifier.

In one embodiment, tags are encoded to correspond with one or more WRBT communities, such as, but not limited to a non-transitive IPv4 address specific extended community. FIG. 3B illustrates a WRBT community message format 320 used in one embodiment to associate a WRBT identifier with one or more routes, or to withdraw a specified WRBT identifier. As shown, the value of the two high order octets 321 of WRBT community message format 320 specifies the type code of the withdraw operation. The W bit 322 is set to one if the community is being used to indicate a withdraw of the associated routes (e.g., a withdraw community), and to zero if the community is being used to associate routes (e.g., an advertise community). Bits seventeen through nineteen (i.e. field 323) are reserved, and are typically set to zero and ignored. The WRBT identifier 324A-B is an opaque quantity assigned by the advertiser. An all-zeroes WRBT identifier 324A-B is reserved and indicates that the identifier is not present, and that the other attributes in the message are to be used to determine which routes are being withdrawn. It is typically used only when the W bit is set.

When a BGP speaker advertises a route, it may include one or more WRBT communities along with that route. The choice of WRBT identifier is a local matter. Although, in one embodiment, the WRBT identifier might be related to the BGP identifier of the external BGP (eBGP) peer which advertised the route. When a BGP speaker receives a route with a WRBT community, it may maintain an index of the association between the WRBT identifier and the route, or it may simply store the WRBT community as it would any other path attribute.

When a BGP speaker which has advertised a set of routes associated with a WRBT identifier wishes to withdraw all of those routes, it may do so using an update message which contains a withdraw by tag community listing the WRBT identifier of the routes to be withdrawn. More than one withdraw by tag community may be included if multiple sets of routes are to be withdrawn. The withdraw by tag community has semantics similar to the withdrawn routes field, in that if feasible NLRI are present in the same update message, the withdraw operations precede the processing of feasible NLRI.

Once a withdraw by tag community has been sent, the associated WRBT identifier has been removed from use (this follows from normal BGP procedures). It may be reused in the future. When a BGP speaker receives an update with a withdraw by tag community, it typically processes the update as though the associated routes had been listed in the withdrawn routes portion of a BGP message.

The withdraw by tag community is typically not transitive. In particular, withdraw by tag communities are typically not forwarded by route reflectors or similar devices; the withdraw by tag community must be regenerated (or stripped) hop-by-hop.

If a withdraw by tag community is received with the partial bit of its path attribute set, it is typically ignored, and a message is typically be logged as this indicates a problem with an upstream router.

Routes can be disassociated from WRBT identifiers using the usual BGP technique of re-advertising the route without the withdraw by tag announce community. Similarly, a route's WRBT identifier association can be changed by re-advertising the route with one or more new withdraw by tag announce communities.

A BGP speaker may also withdraw a set of routes associated with any other path attribute or set of path attributes. It does so by sending an Update message which contains a withdraw by tag community with a WRBT identifier of zero, and the path attributes which define the routes being withdrawn. All advertised routes which are associated with all of the path attributes are considered withdrawn. For example, an update message containing a withdraw by tag community with Identifier zero, an AS Path attribute with path (A, B, C) and a Nexthop attribute with value 10.1.1.1 would result in all routes with AS Path (A, B, C) AND Nexthop 10.1.1.1 being withdrawn. Routes with either of the attributes, but not both, would not be withdrawn. Routes with both of the attributes and other attributes besides would be withdrawn, regardless of the values of the additional attributes.

Note, one embodiment allows routes to be withdrawn using withdraw by tag operations and/or by using operations other than withdraw by tag operations (e.g., withdraw by listing each route as provided for in RFC 1771). The number and/or types of routes that can be associated with a particular tag is unlimited, and the WRBT capability is extensible to meet the needs of a particular application or network configuration. For example, it is typically important to remove routes without corresponding backup routes quickly. Thus, a tag may be associated with each route over a link for which no backup route exists. If this link becomes unavailable, all of these routes can then be removed with a single WRBT message.

FIG. 1 is a block diagram of an exemplary system employing one embodiment. Illustrated therein are multiple nodes 100, 121-122, and 125 of a network, with at least two of these nodes supporting withdrawing multiple advertised routes based on a single tag. A node 100, 121-122, and 125 can be a router or any other networked device.

In one embodiment, node 100 includes a processing element 101, memory 102, storage devices 103, and an interface 104 for receiving and sending packets, items, and/or other information, which are typically coupled via one or more communications mechanisms 109 (shown as a bus for illustrative purposes.) Various embodiments of node 100 may include more or less elements. The operation of node 100 is typically controlled by processing element 101 using memory 102 and storage devices 103 to perform one or more scheduling tasks or processes. Memory 102 is one type of computer-readable medium, and typically comprises random access memory (RAM), read only memory (ROM), flash memory, integrated circuits, and/or other memory components. Memory 102 typically stores computer-executable instructions to be executed by processing element 101 and/or data which is manipulated by processing element 101 for implementing functionality in accordance with the invention. Storage devices 103 are another type of computer-readable medium, and typically comprise solid state storage media, disk drives, diskettes, networked services, tape drives, and other storage devices. Storage devices 103 typically store computer-executable instructions to be executed by processing element 101 and/or data which is manipulated by processing element 101 for implementing functionality in accordance with the invention.

Figure 2A:
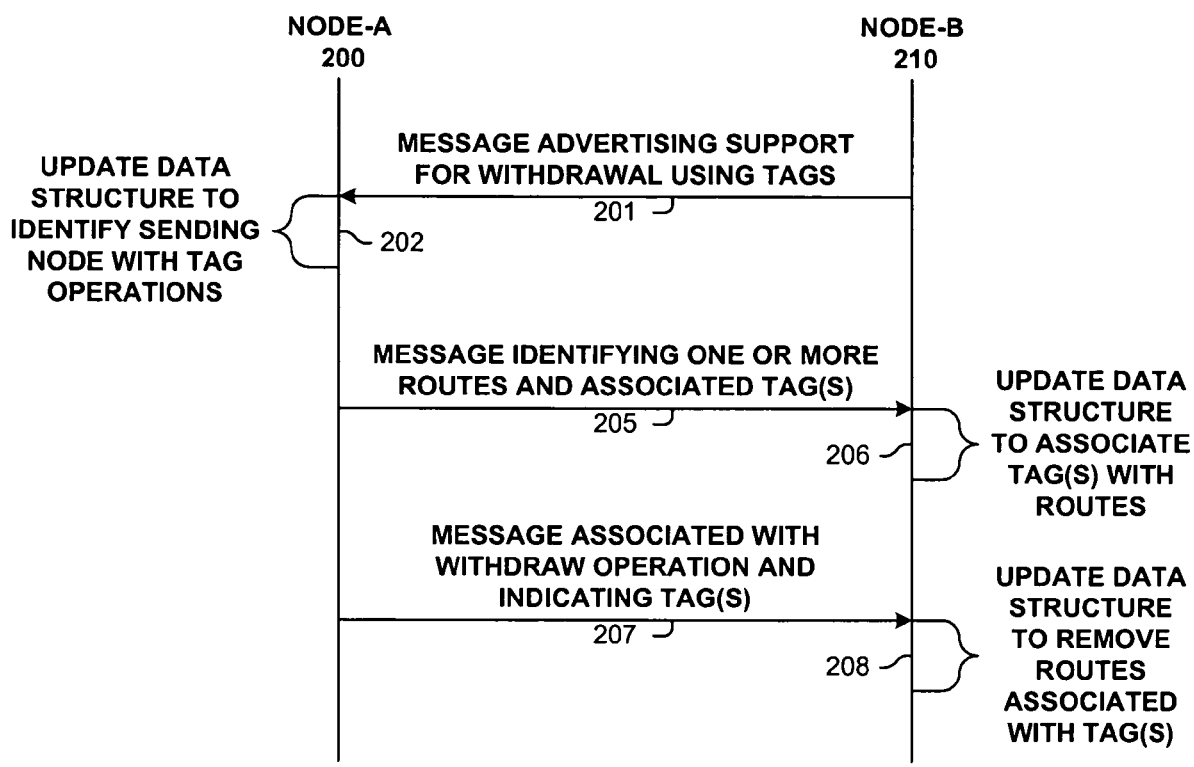
FIG. 2A is a block diagram illustrating messages sent and actions taken in one embodiment.

FIG. 2A is a block diagram illustrating messages sent and actions taken in one embodiment. Shown in FIG. 2A is the processing and sending of messages between node-A 200 and node-B 210.

Typically, a node-B 210 will advertise to other nodes its capability to support withdraw by tag operations, especially in a heterogeneous network where some devices support this feature and some devices do not. It is expected that should this feature be pervasive or otherwise readily supported, there will no longer be the need to advertise this capability as it will be inherent and possibly provided for in a future specification of a protocol. As shown, node-B 210 sends message 201 advertising its support for withdraw of routes based on tags. In one embodiment, in response to message 201, node-A 200 updates one or more data structures to identify that node-B 210 supports withdraw by tag operations.

At some point in time, node-A 200 sends a message 205 which is received by node-B 210. Message 205 identifies one or more routes and their associated tag(s). Note, this association message 205 may or may not be the same message that advertises the routes to node-B 210. In response, node-B 210 updates one or more data structures to associate the tags(s) with the routes, and if the routes were advertised, typically processes these route advertisements as normal.

Node-A, at some point typically later in time, sends a message 207 to node-B 210 which includes an indication to withdraw the one or more routes identified by the tag. In response, node-B 210 identifies the particular routes based on the tag and withdraws them. In one embodiment, node-B 210, in response to message 207, removes the tag from its data structure. In one embodiment, node-B 210, in response to message 207, does not remove the tag physically from its data structure, but rather logically removes the association. Thus, in one embodiment, a message with the same tag could be received by node-B 210 indicating to add (e.g., make available) these previously logically removed routes.

Figure 2B:
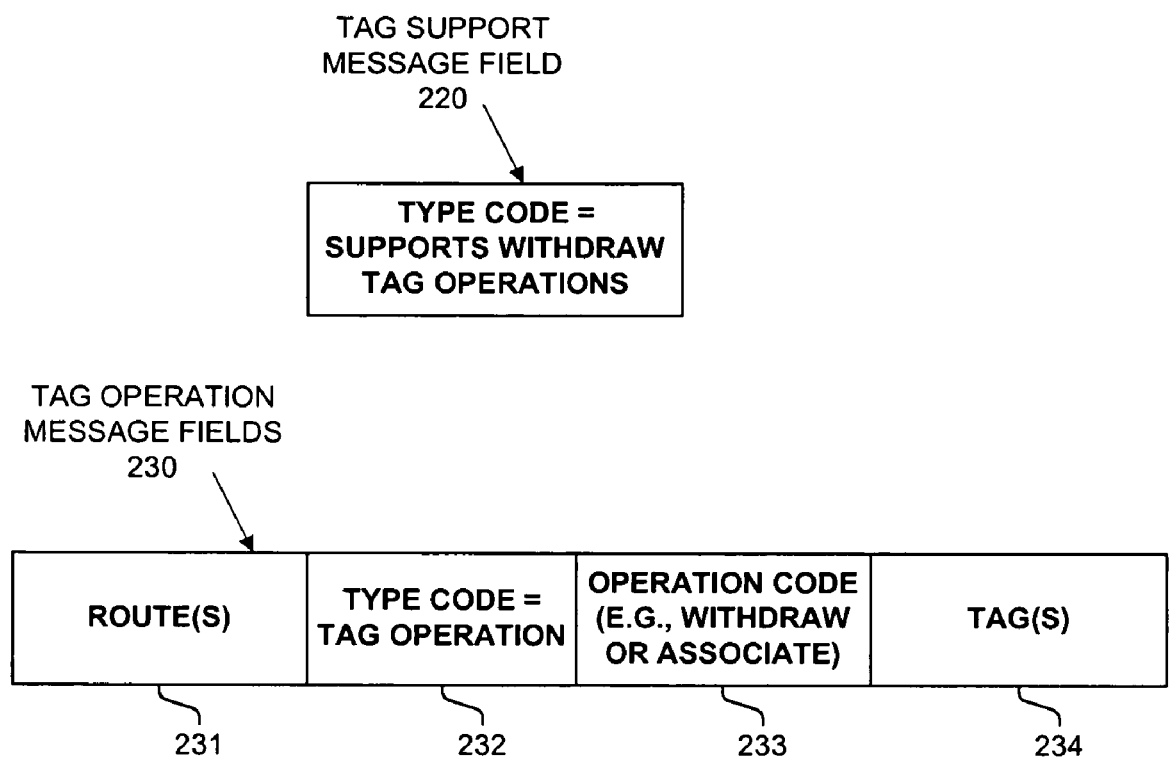
FIG. 2B is a block diagram of messages fields used in one embodiment.

FIG. 2B is a block diagram of messages fields used in one embodiment. Tag support message field 220 is included in a message format supported by the one embodiment. It can be a separate message, or the tag support message field 220 included in another message. Typically, tag support message field 220 includes some value that will be interpreted by a received node as an indication that the sending node supports withdraw by tag operations.

Also shown in FIG. 2B is tag operation message fields 230, which are used to associate tags with routes and/or withdraw routes based on a specified tag. Tag support message field 230 is included in a message format supported by the one embodiment. It can be a separate message, or one or more of tag operations message fields 230 can be included in another message. Typically, tag support message field 230 includes one or more fields 231-234. To associate routes with tags, message field 231 typically specifies one or more routes and message field 234 specifies one or more tags, with field 232 indicating a tag operation, and field 233 indicating a tag association operation. To withdraw one or more routes associated with a tag, tag field 234 specifies the tag(s), with field 232 indicating a tag operation, field 233 indicating a tag withdraw operation, and field 231 typically being ignored or not included in the message.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, performed by a particular router, for withdrawing routes, the method comprising:

receiving, from one or more other routers communicatively coupled to the particular router, one or more routing protocol messages identifying (a) a plurality of particular routes to be added to a routing database within the particular router; and (b) a particular tag associated with the plurality of particular routes;

in response to said receipt of said one or more routing protocol messages: updating the routing database within the particular router to include the plurality of particular routes, and associating each route of the plurality of particular routes with the particular tag in a manner that all of the routes in the plurality of particular routes can be subsequently identified based on the particular tag;

receiving, from one of said one or more other routers, a particular routing protocol message associated with a route withdraw operation to withdraw one or more routes from the routing database based on a specified tag in the particular routing protocol message, with the specified tag being the particular tag;

determining, based on said associations of routes and tags in the routing database, that said one or more routes to be withdrawn based on the specified tag received in the particular routing protocol message include the plurality of particular routes; and withdrawing the plurality of particular routes from the routing database, in response to said operation of determining that said one or more routes to be withdrawn based on the specified tag received in the particular routing protocol message include the plurality of particular routes.

2. The method of claim 1, wherein said one or more routing protocol messages are Border Gateway Protocol messages, and the particular tag is a Border Gateway Protocol attribute.

3. The method of claim 2, wherein said one or more routing protocol messages are Border Gateway Protocol messages, and the particular tag is Border Gateway Protocol communities attribute.

4. An apparatus, comprising:
means for receiving, from one or more routers communicatively coupled to the apparatus, one or more routing protocol messages identifying (a) a plurality of particular routes to be added to a routing database within the apparatus; and (b) a particular tag associated with the plurality of particular routes;
means for, in response to said receipt of said one or more routing protocol messages, updating the routing database in the apparatus to include the plurality of particular routes, and maintaining an association between each route of the plurality of particular routes with the particular tag in a manner that all of the routes in the plurality of particular routes can be subsequently identified based on the particular tag;
means for receiving, from one of said one or more routers, a particular routing protocol message associated with a route withdraw operation to withdraw one or more routes from the routing database based on a specified tag in the particular routing protocol message, with the specified tag being the particular tag; and
means for withdrawing the plurality of particular routes from the routing database based on the particular tag received in the particular routing protocol message in response to: said receipt of the particular routing protocol message, and after determining that the plurality of particular routes are to be withdrawn based on the particular tag received in the particular routing protocol message and said maintained associations between the plurality of particular routes and the particular tag.

5. The apparatus of claim 4, wherein said one or more routing protocol messages are Border Gateway Protocol messages, and the particular tag is a Border Gateway Protocol attribute.

6. The apparatus of claim 5, wherein said one or more routing protocol messages are Border Gateway Protocol messages, and the particular tag is Border Gateway Protocol communities attribute.

7. A method performed by a router for withdrawing routes, the method comprising:
sending, by the router to one or more other routers in a network including a plurality of other routers, a message including an advertisement of a capability of associating multiple routes with tags;
subsequent to said sending of the message including the advertisement of the capability of associating multiple routes with tags: receiving, by the router from one or more of the plurality of other routers, one or more messages; wherein said one or more messages identify a plurality of routes and a tag associated with the plurality of routes;
in response to said receipt of said one or more messages, the router: updating a routing database within the router to include the plurality of routes, and associating each route of the plurality of routes with the tag in a manner that all of the routes in the plurality of routes can be subsequently identified based on the tag;
receiving, by the router from another router of the plurality of other routers, a particular message associated with a route withdraw operation to withdraw one or more routes based on a specified tag from the routing database, the particular message including the tag;
determining, by the router, the plurality of routes to be withdrawn based on the tag received in the particular message; and
withdrawing, by the router, the plurality of routes from the routing database, in response to said operation of determining the plurality of routes to be withdrawn based on the tag received in the particular message.

8. The method of claim 1, wherein the specified tag is an opaque value selected by a router, advertising the plurality of particular routes, of said one or more other routers.

9. A method performed by a first router for requesting routes to be withdrawn from a second router, the method comprising:
sending, by the first router, one or more messages to the second router identifying a plurality of routes and a particular tag associated with the plurality of routes for the second router to associate each route of the plurality of routes with the particular tag in a manner that all of the routes in the plurality of routes can be subsequently identified by the second router based on the particular tag; and
sending, by the first router subsequent to said operation of sending of one or more messages to the second router, a particular message to the second router associated with a route withdraw operation to withdraw one or more routes based on a specified tag from the routing database, the particular message including the particular tag for use by the second router in identifying the plurality of routes;
wherein said operation of sending one or more messages to the second router is performed in response to receiving, from another router, a message including an advertisement of a capability of the second router of associating multiple routes with a tag for use in registering the multiple routes and for withdrawing the multiple routes based on the tag without having to specify each of multiple routes.

10. The method of claim 9, wherein the particular tag is a Border Gateway Protocol attribute.

11. The method of claim 10, wherein the particular tag is Border Gateway Protocol communities attribute.

12. The method of claim 9, wherein the particular tag is an opaque value selected by the first router.

13. The apparatus of claim 4, comprising means for sending a message, to each of said one or more routers, advertising a capability of associating multiple routes with a tag for use in registering the multiple routes and for withdrawing the multiple routes based on the tag without having to specify each of multiple routes.

14. The apparatus of claim 4, wherein the particular tag is an opaque value selected by a router, advertising the plurality of particular routes, of said one or more routers.

15. An apparatus comprising one or more processors and memory, wherein the memory stores one or more instructions that, when executed by said one or more processors, perform operations comprising:
in response to one or more routing protocol messages, received by the apparatus from one or more routers communicatively coupled to the apparatus, identifying (a) a plurality of particular routes to be added to a routing database within the apparatus, and (b) a particular tag associated with the plurality of particular routes: updating the routing database to include the plurality of particular routes, and associating each route of the plurality of particular routes with the particular tag in a manner that all of the routes in the plurality of particular routes can be subsequently identified based on the particular tag;

in response to a particular routing protocol message, received by the apparatus from one of said one or more routers, associated with a route withdraw operation to withdraw, from the routing database, one or more routes based on a specified tag in the particular routing protocol message, with the specified tag being the particular tag;

determining, based on said associations of routes and tags in the routing database, that said one or more routes to be withdrawn based on the specified tag received in the particular routing protocol message include the plurality of particular routes; and withdrawing the plurality of particular routes from the routing database, in response to said operation of determining that said one or more routes to be withdrawn based on the specified tag received in the particular routing protocol message include the plurality of particular routes.

16. The apparatus of claim 15, wherein said one or more routing protocol messages are Border Gateway Protocol messages, and the particular tag is a Border Gateway Protocol attribute.

17. The apparatus of claim 16, wherein said one or more routing protocol messages are Border Gateway Protocol messages, and the particular tag is Border Gateway Protocol communities attribute.

18. The apparatus of claim 15, wherein said operations comprise: sending a message including an advertisement of a capability of associating multiple routes with tags.

19. The apparatus of claim 15, wherein the particular tag is an opaque value selected by a router, advertising the plurality of particular routes, of said one or more routers.

20. An apparatus comprising one or more processors and memory, wherein the memory stores one or more instructions that, when executed by said one or more processors, perform operations comprising:

sending, by the apparatus to one or more other routers in a network including a plurality of other routers, a message including an advertisement of a capability of associating multiple routes with tags;

in response to one or more messages, received by the apparatus from one of the plurality of other routers, identifying a plurality of routes and a tag associated with the plurality of routes: updating a routing database within the apparatus to include the plurality of routes, and associating each route of the plurality of routes with the tag in a manner that all of the routes in the plurality of routes can be subsequently identified based on the tag;

in response to a particular message, received by the apparatus from another router of the plurality of other routers, associated with a route withdraw operation to withdraw one or more routes based on a specified tag from the routing database, the particular message including the tag;

determining the plurality of routes to be withdrawn based on the tag received in the particular message; and withdrawing the plurality of routes from the routing database, in response to said operation of determining the plurality of routes to be withdrawn based on the tag received in the particular message.

* * * * *